No. 804,740. PATENTED NOV. 14, 1905.
C. K. LASSITER.
VARIABLE SPEED GEARING.
APPLICATION FILED MAR. 11, 1905.

Witnesses
Edwin G. McKee
C. C. Hines

Inventor
Columbus K. Lassiter

By Victor J. Evans
Attorney

No. 804,740. PATENTED NOV. 14, 1905.
C. K. LASSITER.
VARIABLE SPEED GEARING.
APPLICATION FILED MAR. 11, 1905.

Witnesses
Edwin F. McKee
C. C. Hines.

Inventor
Columbus K. Lassiter
By Victor J. Evans
Attorney

No. 804,740. PATENTED NOV. 14, 1905.
C. K. LASSITER.
VARIABLE SPEED GEARING.
APPLICATION FILED MAR. 11, 1905.

Witnesses
Edwin F. McKee
C. C. Hines

Inventor
Columbus K. Lassiter
By Victor J. Evans
Attorney

UNITED STATES PATENT OFFICE.

COLUMBUS K. LASSITER, OF SCHENECTADY, NEW YORK.

VARIABLE-SPEED GEARING.

No. 804,740.      Specification of Letters Patent.      Patented Nov. 14, 1905.

Application filed March 11, 1905. Serial No. 249,620.

*To all whom it may concern:*

Be it known that I, COLUMBUS K. LASSITER, a citizen of the United States, residing at Schenectady, in the county of Schenectady and State of New York, have invented new and useful Improvements in Variable-Speed Gearing, of which the following is a specification.

This invention relates to change-speed transmission-gearing for the driving mechanism of automobiles or power apparatus of different kinds wherein it is necessary or desirable to provide means for operating a driven part at various rates of speed from a driving part and to reverse the direction of motion of the driven part to meet various contingencies.

One object of my invention is to provide transmission-gearing in which a shiftable gear on one part may be thrown into and out of gear with any one of a series of gears of progressively-increasing diameter or speed ratio on another part to change the speed of the driven element or elements at will and to produce a construction which will permit the gears to be moved into and out of meshing engagement with a minimum of wear upon the teeth thereof and which will avoid the necessity of making the teeth of special formation, as is required when the gears are thrown into mesh by transverse sliding contact, and will also prevent the cutting of the teeth, which invariably results when a relatively transverse sliding contact motion is used.

Another object of the invention is to provide an improved system of gearing and construction of parts whereby the shifting of the necessary elements to vary the speed or reverse or stop the motion of the driven part may be accomplished through the medium of adjusting devices so juxtaposed and arranged as to enable the gearing to be more easily and quickly controlled and simplifying the operation in such manner as to diminish to a material extent the liability which exists when a number of segregated adjusting devices are employed of improperly shifting the gearing when it is necessary to reverse or bring the driven mechanism to an immediate stop, and, further, to provide means for locking the adjusting devices in any of the positions to which they may be adjusted.

Still another object of the invention is to provide a construction of gearing in which the driving element may be connected indirectly through variable-speed gearing to the driven part or directly thereto, as desired, so as to enable a wide range of speed to be obtained, and to so construct the operating means through which these connections are obtained that the intermeshing elements of the variable-speed gearing will be thrown into and out of operative engagement in a proper manner to prevent injury thereto from sudden speed changes.

Still another object is to generally simplify and improve the construction and increase the practical efficiency of this class of gearing.

In the accompanying drawings I have shown certain means for carrying my invention into practical effect without, however, intending to limit the invention to the particular construction and organization of parts which for the sake of illustration I have set forth.

Figures 10, 11, 12:
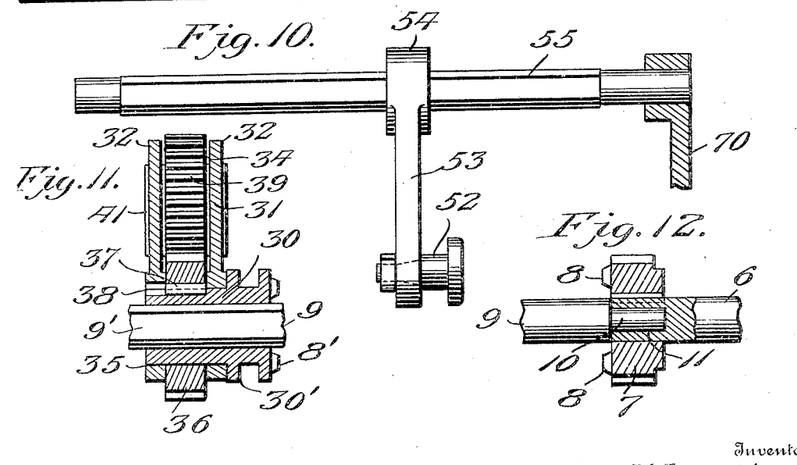
Fig. 10 is a similar view of the rock-shaft and rocker-arm for shifting the power transmitting and reversing gears into and out of mesh with the coacting gears.
Fig. 11 is a detail section through the sliding and rocking carriage and associated power transmitting and reversing gears, taken on line 11 11 of Fig. 1.
Fig. 12 is a detail view, partly in section, showing the construction at the adjacent ends of the driving and driven shafts.
Figure 13:
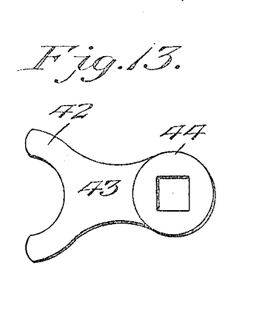
Fig. 13 is a detail view of the yoke or shipper arm for sliding the shifting carriage.
Figure 14:
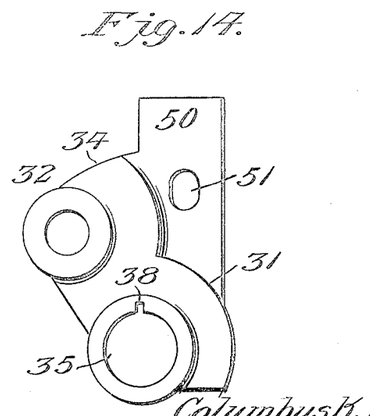
Fig. 14 is a detail side elevational view of the carriage.

Referring now more particularly to the drawings, the numeral 1 designates a casing of suitable form and size to inclose and protect the elements of the gearing, the said casing consisting of top and bottom sections 2 and 2', provided with flanges 3 and 4 at their meeting edges to adapt them to fit closely together and to be bolted or otherwise suitably fastened. The lower section 2' is provided with suitable projections 5 at its sides, by which it may be bolted or otherwise secured to a suitable foundation or the supporting-frame of the gearing of an automobile or other driving apparatus in connection with which the improved transmission-gearing is to be used. The lower section 2' of the casing will thus be rigidly fastened to the support, while the upper section 2 thereof may be detached therefrom by removing the securing-bolts passing through the flanges 3 and 4 to permit access to the gear elements when repairs or the substitution of new for old or worn-out parts is required. In practice the lower casing-section will be partially filled with a suitable lubricating-oil, which will be distributed by the action of the gearing to the working parts thereof. Extending at one end into the casing, through one end thereof, is an engine or main driving-shaft 6, which is provided at its inner end with a main driving-pinion 7, the inner face of which is properly toothed or recessed to form a clutch member 8. Arranged in alinement with the shaft 6 is a shaft 9, whose inner end is reduced to form a journal 10, which fits and turns within a bearing-socket 11 in the inner end of the said shaft 6, thus permitting the latter-named shaft to turn freely under normal conditions without imparting motion to the shaft 9, while forming a bearing for the inner end of said shaft and bringing the same in proper juxtaposition to the shaft 6 to provide for their connection in the manner hereinafter described for directly driving the shaft 9 when the highest limit of speed is required. The pinion 7 fits upon and is keyed or otherwise fixed to the inner end of the shaft 6, as shown in Fig. 12. The outer end of the shaft 9 extends to the exterior of the casing through the end thereof opposite the end at which the inner end of the shaft 6 enters and constitutes a driven shaft which is adapted to be connected to receive motion from the shaft 6 and to transmit motion to the drive-gearing of an automobile or other driving apparatus to be driven.

Extending in parallel relation to the shaft 9 is a hollow power-transmitting shaft 12, mounted to revolve upon an axle 13, provided with trunnions 14, journaled in suitable bearing-sections upon the flanged edges of the casing-sections 2 and 2'. The body of the axle 13 is circular in form, but set eccentric to the trunnions 14, so that by oscillating said axle the shaft 12 will be shifted closer to or farther from the shaft 9. Keyed or otherwise fixed to the hollow shaft 12 is a series of change-speed or variable-speed gears 19, 20, 21, and 22 of progressively-increasing diameters, the gear 19 being the smallest and the gear 22 the largest of the series. These gears are designed to communicate indirect motion through the shaft 12 from the shaft 6 to the shaft 9 at varying speeds through the medium of an adjustable transmission-gear, which may be thrown into and out of engagement with any one of the said series of variable-speed gears, as will be hereinafter described. The driving-pinion 7 on the inner end of the shaft 6 meshes with an idler 23, journaled upon a stub-shaft 24, mounted in the adjacent end wall of the upper casing-section 2, and this idler in turn meshes with and normally transmits motion to a gear-wheel 25, fixed upon the adjacent end of the shaft 12. When the engine-shaft 6 is in motion, therefore, the pinion 7 will drive the shaft 12 through the medium of the coöperating intermeshing gears 23 and 25, the shaft 12 turning in the same direction as the shaft 6. On the opposite end of the shaft 12 from the gear 25 is a gear 27, which normally meshes with an idler gear or pinion 28, carried by a stub-shaft 29, journaled in the contiguous end wall of casing-section 2, these gears serving to impart motion from the shaft 12 to the shaft 9 through the transmission-gearing, hereinbefore referred to, to reverse the motion of the shaft 9 or drive it in the opposite direction to which it is driven from any one of the variable-speed gears, so that the driving mechanism of the automobile or other machinery may be reversed to quickly stop the gearing or back the vehicle when occasion requires.

That portion or end of the shaft 9 which projects within the casing is squared or made of any other suitable polygonal form in cross-section, as indicated at 9', and supports a collar or sleeve 30, which has a bore or passage corresponding in form to that of the shaft to permit it to slide thereon and at the same time couple it to turn with the shaft. Upon this sleeve or collar 30 is mounted a shifting carriage 31, which is provided with spaced flanges 32, suitably shaped to form partial gear-chambers 33 and 34, the flanges or side walls of the lower housing 33 being formed with openings 35 to receive the ends of the said sleeve. The housing 33 receives a power-transmission gear 36, which is carried by the sleeve 30, the outer face of the sleeve and inner wall of said gear being provided with slots to receive a key 37, whereby they are firmly connected to turn in unison. In order to permit of the insertion and removal of said key, one of the side walls of the housing 33 is formed with a slot 38. In assembling the parts the sleeve is first placed in position upon the shaft and the gear 36 then placed in position thereon, after which the sleeve 30 is slid endwise into engagement with its receiving-openings in the walls of the housing 33 and the gear and sleeve adjusted so as to bring their key-sleeve-receiving slots into alinement with the slot 38, whereupon the key 37 may be inserted to connect them for simultaneous movement. When the key is so inserted, the gear 36 will be locked to the sleeve to turn with the shaft 9, and the lower end of the shifting carriage 31 will be so mounted upon the sleeve that it may slide therewith along the shaft 9 and yet turn or pivot independently upon the sleeve, so that by a swinging motion thereof at right angles to the shaft 9 the gear 36 may be swung toward and from the variable-speed gears 19, 20, 21, and 22 on the shaft 12. The housing or chamber 34, above the housing 33, receives a gear 39, which meshes with the gear 36 and is mounted on a shaft 40, journaled in bearings 41, formed upon the side walls of said housing 34. This gear 39 is so arranged that it may be turned by the movement of the carriage 31 into and out of mesh with the pinion 28 to turn the shaft 9 backward or reverse its motion, as will be readily understood. One end of the sleeve 30 projects beyond the carriage 31 and is formed with a peripheral groove 30′ to receive the yoked end 42 of a shipper-arm 43, the opposite end of which is formed with a collar or head 44, having a rectangular opening for the passage of a sliding rod or bar 45, to which it is secured by a set-screw or similar fastening 46. The rod or bar 45 extends parallel with the shafts 9 and 12 and is endwise movable in bearings formed upon the ends of the casing. Fixed to the rod is a stop-collar 47, which abuts against one of the bearings and limits the retractive movement of said rod. Surrounding the other end of the rod is a retracting-spring 48, fixed at its inner end, as indicated at 49, to said rod and abutting at its outer end against the other bearing for the rod at the opposite end of the casing. When the rod is moved forwardly or against the tension of said spring, the latter will be compressed, and upon the release of the rod the spring will restore it to its normal position (shown in Fig. 2) or to any intermediate position into which it may be locked, as hereinafter described. By means of the said forward movement of the rod motion will be transmitted through the shipper-arm 43 to the sleeve 30, thereby sliding the carriage 31, with the gears 36 and 39 carried thereby, toward the driving-pinion 7 on the inner end of the shaft 6, so as to enable the transmission-gear 36 to be brought to a position opposite any one of the change-speed gears 19, 20, 21, and 22. A reverse movement of the rod under the retractive action of its spring 48 will, on the other hand, shift the collar 30 and carriage 31 backward, so that it may be reversely positioned opposite the change-speed gears and when the carriage is at the limit of its inward movement will lie opposite the reversing-gear 28. The grooved end of the sleeve 30 is formed with clutch projections or recesses 8′ to engage the clutch member 8 on the driving-pinion 7 when the carriage is shifted outward or forward to the limit of its movement, so that the shaft 9 may be connected directly to the driving-shaft 6. The carriage 31 is provided with an upwardly-extending arm 50, formed with an elongated slot 51 to receive a headed pin or stud 52 on the lower end of a rocker-arm 53. The upper end of the arm 53 is formed with a head 54, having a polygonal opening to receive the polygonal portion of a rock-shaft 55, arranged above the shaft 9 and journaled at its ends in the end walls of the casing. By this construction the head 54 is fitted to slide longitudinally on the polygonal portion of the rock-shaft 55 and is also adapted to slide thereon to guide and accommodate the carriage 41 in its sliding movement on the shaft 9. The slot-and-pin connection between the arms 50 and rocker-arm 53 adapts the said arms to assume an angular position when the shaft 55 is turned in one direction or the other, thereby permitting the carriage 31 to be rocked or swung upon the sleeve 30, so as to adapt said carriage to have a variable rocking action to permit the gear 36 to be shifted into and out of mesh with either of the change-speed gears 19, 20, 21, or 22 and to also shift the reversing-gear 39, carried thereby, into and out of mesh with the reversing-idler 28, meshing with the gear 27 on the shaft 12. It will thus be seen that the carriage 31 may be moved longitudinally along the shafts 9 and 55 to position the transmission-gear 36 and reversing-gear 39 opposite any one of the coacting gears on the shaft 12 and that said carriage may also be rocked or oscillated from the shaft 55 to permit the said gears carried thereby to be adjusted toward and from and thereby thrown into and out of mesh with the said gears on the shaft 12.

The carriage 31 and gears 36 and 39 form part of a shifting mechanism which includes means for sliding the carriage to vary the position of the same on the portion 9′ of shaft 9 and also means for rocking or oscillating said carriage to throw said gears into and out of meshing engagement with the change-speed gears or reversing-gear. The means for effecting these operations will now be described and will be followed by a description of means employed for throwing the gear 25 into and out of mesh with the idler 23, so that the shaft may be controlled in action and may be thrown out of action to prevent useless wear and tear and churning of the oil contained within the casing when the shaft 9 is directly coupled with the shaft 6.

Figure 1:
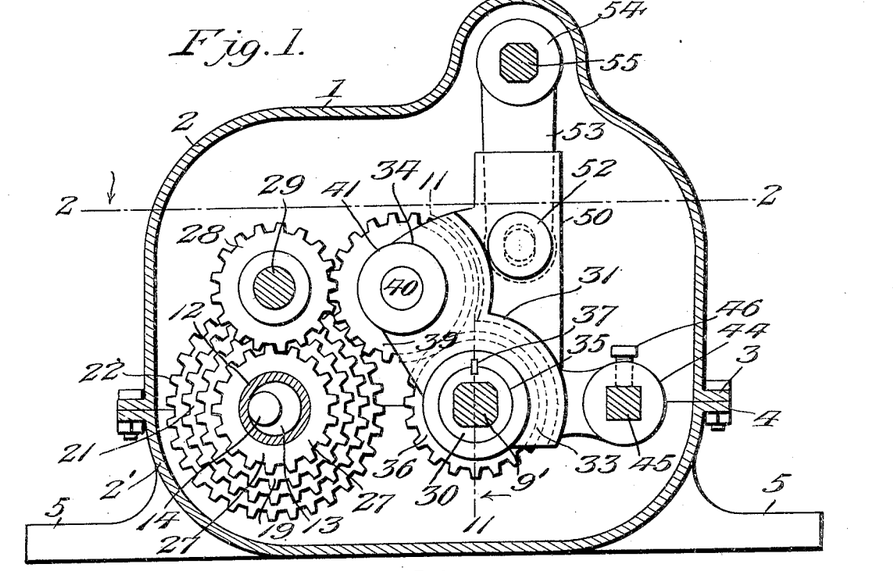
Figure 1 is a vertical section, taken on the plane indicated by the line 1 1 of Fig. 2, of the change-speed gearing embodying my invention, showing the reversing-gears in meshing relation.
Figure 2:
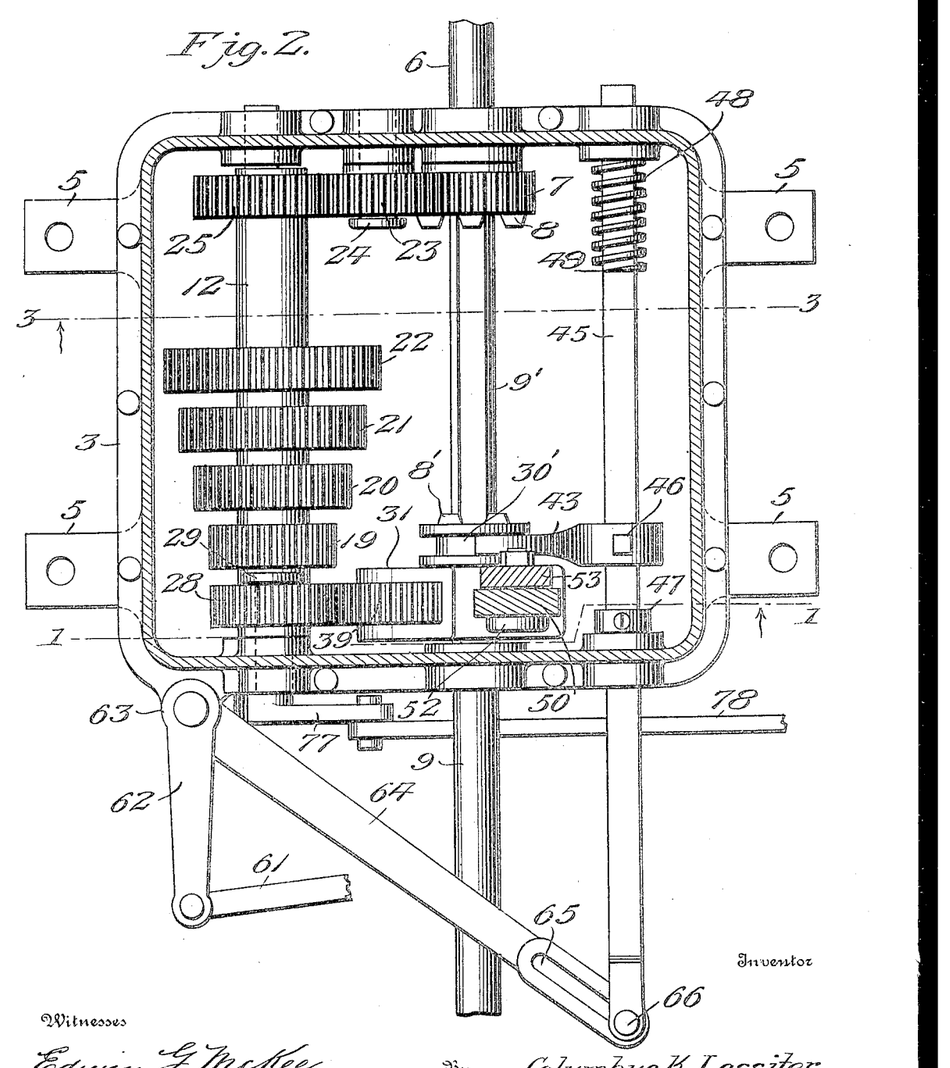
Fig. 2 is a horizontal section taken on line 2 2 of Fig. 1.
Figure 3:
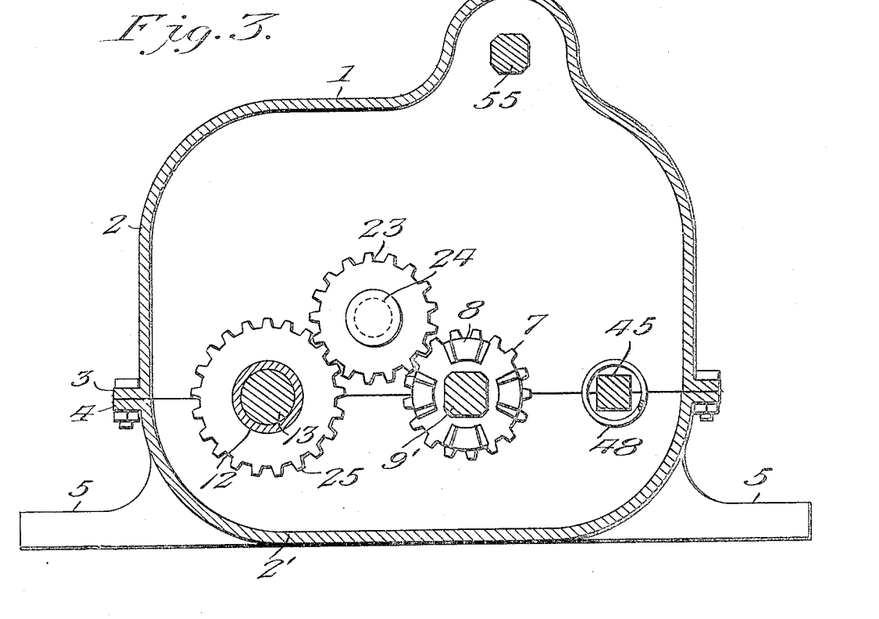
Fig. 3 is a vertical section taken on line 3 3 of Fig. 2.
Figures 4, 5:
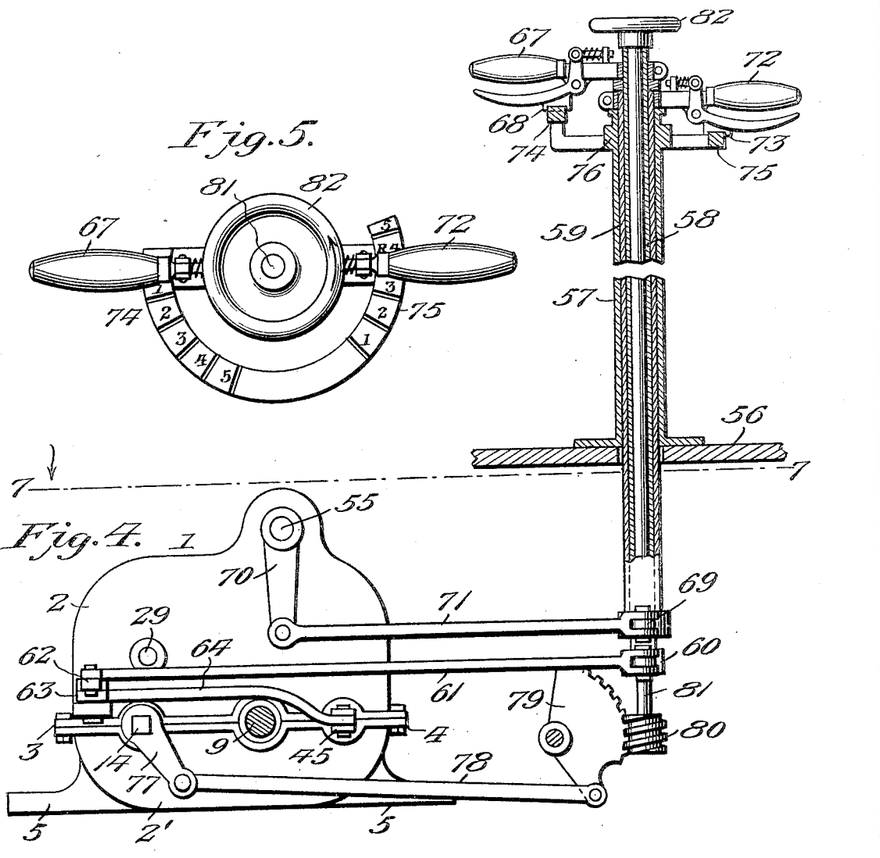
Fig. 4 is an end elevational view of the gearing and a vertical section through the controlling mechanism.
Fig. 5 is a top plan view showing the operating-levers of the controlling mechanism and the coacting racks of the locking-head.
Figure 6:
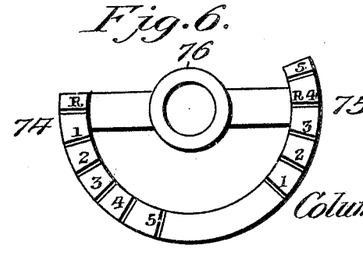
Fig. 6 is a similar view of the locking-head.
Figure 7:
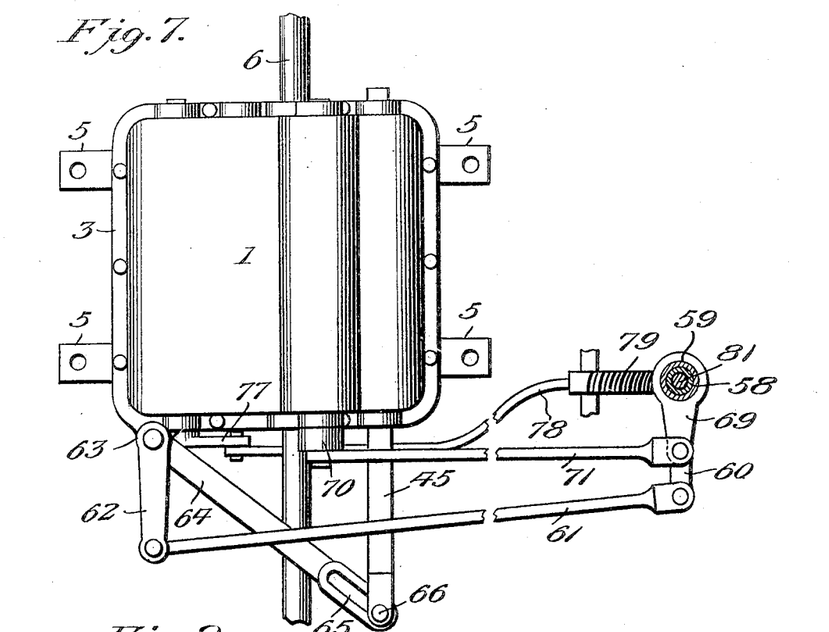
Fig. 7 is a top plan view of the complete gearing and a horizontal section through the controlling mechanism.
Figure 8:
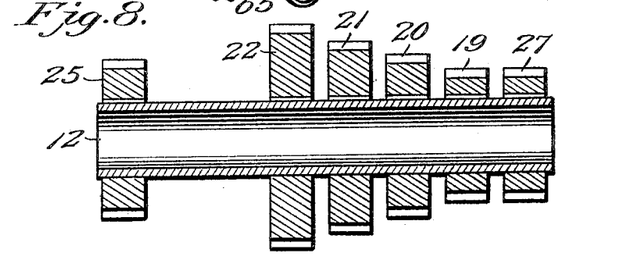
Fig. 8 is a longitudinal section through the hollow power-transmission shaft and change-speed gears.
Figure 9:
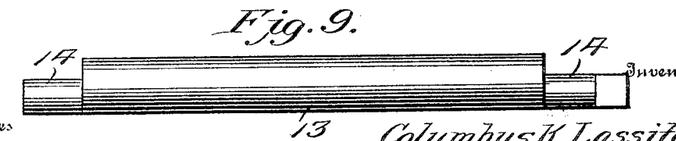
Fig. 9 is a detail view of the eccentric axle for adjusting said power-transmission shaft and change-speed gears.

Suitably secured at its lower end to a support 56, which may constitute any appropriate portion of a motor-vehicle body, is a hollow post or standard 57, within which are arranged two hollow concentric shafts 58 and 59, the inner shaft 58 carrying at its lower end a crank-arm 60, to which one end of a connecting-rod 61 is attached, the opposite end of said rod being connected with the short arm 62 of a bell-crank lever 63, which has a long arm 64 normally projecting at an outward angle to the adjacent end of the casing 1 and formed at its free end with a slot 65, receiving a pin or stud 66 on one end of the sliding rod or bar 45, the construction and arrangement of these parts being such that when the hollow shaft or sleeve 58 is turned in one direction or the other motion will be transmitted through the bell-crank lever to project or retract the bar 45 or, in other words, move it outward and inward, its inward movement being assisted or effected through the instrumentality of the spring 48, as heretofore explained. To the upper end of the sleeve 58 is attached an operating hand-lever 67, which carries a spring-actuated latch or dog 68, adapted to engage any one of a series of receiving-notches in a locking plate or head, hereinafter described, to lock the sleeve in any of its adjusted positions and to thereby maintain the shifting carriage and gears carried thereby in alinement with any one of the gears on the shaft 12 or the gear 28 operated thereby. The shaft or sleeve 59 is similarly provided at its lower end with a crank-arm 69, which is operatively connected with a crank-arm 70 on one end of the rock-shaft 55 by a connecting-rod 71, so that when said shaft 59 is turned in one direction or the other the shaft 40 will be correspondingly rocked and will rock or swing the carriage 31 to shift one or the other of the gears carried thereby into and out of mesh with the coöperating gear in alinement with which it is positioned. To the upper end of the sleeve 59 is attached an operating hand-lever 72, carrying a spring-actuated latch or dog 73 for locking said sleeve and shaft 55 in any of the positions to which they are adjusted. The said dogs or latches 68 and 73, carried by the operating hand-levers 67 and 72, are arranged to respectively coöperate with segmental racks 74 and 75, carried by a locking-head 76, fixed upon the upper end of the post or standard 57, one of said racks being disposed above the plane of the other in order to accord with the corresponding positions of the hand-levers 67 and 72, which are disposed in different horizontal planes in order to permit them to be attached to the upper ends of the sleeves or shafts 58 and 59. The rack 74 is provided with a series of notches bearing suitable gage or index characters, six of these notches being shown in the present instance and designated, respectively, in regular order by the letter "R" and the numerals "1," "2," "3," "4," and "5." The letter "R" denotes the receiving notch or recess in which the dog of the latch 68 is received when the hand-lever 67 is locked in such position that the carriage 31 has been shifted to bring the gear 39 in alinement with the gear 28—in other words, the reverse position—while the numerals "1," "2," "3," "4," and "5" designate speed positions from the highest to the lowest, and indicating those notches or recesses which respectively receive the locking-dog of the latch when the operating-lever is arranged so as to bring the gear 36 opposite the respective change-speed gears 19, 20, 21, and 22 and also a final position in which the parts have been shifted to move the gear 36 outwardly or forwardly past the gear 22 to bring the clutches 8 and 8' in engagement and connect the shafts 6 and 9 directly together. The rack 75 is shown in the present instance as provided with a series of five such recesses or notches, (designated "1," "2," "3," "4," and "5," respectively,) the letter "R" also being placed opposite the numeral "4" of the fourth notch in order to determine the position of the dog or latch 73 for the adjustment of the handle 72 to a single position for two different operations. In other words, the numerals "1," "2," "3," "4," and "5" indicate the extent of swinging movement of the shaft 58 required to rock or oscillate the carriage 31 to swing the transmission-gear 36, respectively, into engagement with the change-speed gears 19, 20, 21, and 22, while the letter "R" indicates that the handle 72 must be moved to the same position for swinging the gear 39 to engage the gear 28 that it would be swung in order to bring the gear 36 into mesh with the fourth speed position change-speed gear 22. It will thus be understood that in the operation of shifting the gearing to vary the speed of operation thereof or to reverse the same the levers 67 and 72 controlling the action of the driving parts will be moved to certain determined positions indicated by the characters on the racks 74 and 75. Figs. 1 and 2 show the carriage 31 shifted to bring the gear 39 into mesh with the gear 38 to reverse the direction of motion of the gearing, as will be readily understood, and when the parts are so disposed it will of course be apparent that the latch 68 of the lever 67 should engage the notch "R" of rack 74, while the latch 73 of the lever 72 should engage the notch marked "R$^4$" of the rack 75. In order to throw the reversing-gears out of operation and throw the other gears into action for a forward movement of the gearing again, the positioning-lever 67 is swung to a greater or less extent over the rack 74 until the notch indicating the desired speed position is reached, when the latch 68 is released to lock the parts of the positioning mechanism in such position, the gear 68 thus being adjusted by a sliding movement of the carriage 31 until it lies opposite the particular gear of the change-speed gears on the shaft 12 designated by the notch. In order to throw the gear 36 into mesh with the speed-gear, the meshing lever 72 is adjusted to the desired extent until its dog 73 registers with the corresponding notch of the rack 75, when the dog is released to lock the lever in such position, the adjustment of the parts through such action of the lever causing the carriage 31 to be rocked to project the gear 36 into meshing engagement with the particular gear of the change-speed gears opposite which it has been adjusted by the positioning mechanism. Hence it will be clear that when, for instance, the lever 67 is adjusted until its dog 68 engages notch "3" of rack 74 that the carriage 31 will have been shifted to bring the gear 36 opposite the third speed-gear 21 of the series of speed-gears on the shaft 12 and that correspondingly the lever 72 should be adjusted until its dog engages the corresponding notch 3 of the rack 75 in order that the carriage 31 may be swung to the proper extent to project the gear 36 into engagement with said change-speed gear 21. A reverse movement of these levers will of course shift the carriage 31 backwardly or in reverse order to the movements previously described and will move the gear 36 out of mesh with the change-speed gear with which it has been engaged and longitudinally along the series of change-speed gears. The parts are so constructed and arranged that when the lever 67 is in the reverse notch of rack 74 the lever 72 should be adjusted to the fourth position notch "R⁴" of rack 75, as a corresponding swinging movement of the carriage 31 is required to move the gear 39 into mesh with the gear 38 and the gear 36 into mesh with the gear 22. When the two levers are moved to the fifth positions on the two racks, the gears 36 and 39 will be moved forwardly beyond the fourth-position gear 22 of the change-speed gears, and the clutch devices 8 and 8' will be brought into engagement, thus coupling the shafts 6 and 9 directly together for the highest obtainable speed and simultaneously throwing the change-speed gearing out of connection with the shaft 9. In disconnecting the shaft 9 from the shaft 6 the operating-lever 67 is swung backwardly over the rack 74 until the carriage is adjusted to the desired position, and then the lever 72 is operated to throw the required gears into mesh. It will be understood from the foregoing description that by means of the two levers 67 and 72 the operation of the gearing may be thoroughly controlled to secure any desired range of speed within the limit of speed of the gearing, and it will be seen that as these levers are disposed in close relation they may be operated without confusion to stop or reverse the gearing when occasion requires.

It is desirable when the clutches 8 and 8' are in engagement to directly connect the drive-shaft 6 with the driven shaft 9 to throw the gear 25 out of meshing engagement with the idler-gear 23 in order to arrest the motion of the shaft 12 and to thus prevent useless wear thereof and unnecessary churning by the change-speed gears of the lubricating-oil within the casing. In order to attain this end, I provide means for adjusting the shaft 12 to throw the said gears into and out of operation at will, the said means comprising a crank-arm 77, attached to one end of the eccentric-axle 13 and operated by a connecting-rod 78 from a suitably-mounted worm-toothed segment 79. Meshing with the teeth of this segment is a worm-gear 80, mounted upon the lower end of a shaft 81, which extends upwardly through the hollow shaft 57 and above the levers 67 and 72 and is provided at its upper end with a hand-wheel or other suitable operating device 82, whereby it may be turned to adjust the segment 79. By moving this segment in one direction or the other the crank 77 will transfer motion to the eccentric-axle 13. The latter in turning will vary the position of the shaft 12, moving it closer to or farther from the shaft 9, so as to throw the gears 23 and 25 into and out of mesh. Hence the change-speed gearing may be thrown out of operation in a convenient manner when it is desired to guide the shaft 9 directly from the shaft 6.

From the foregoing description, taken in connection with the accompanying drawings, the construction and mode of operation of my invention will be apparent, and it will be seen that it provides simple and effective means for driving a driven shaft at varying rates of speed from a driving-shaft and for connecting it for direct motion or indirect motion through variable-speed mechanism with the driving-shaft, and, further, that it provides simple and effective means for throwing the variable-speed gearing out of operation when the driving and driven elements are directly coupled. The advantages of my construction are, first, that it simplifies and reduces the number of elements required to obtain the specified results and diminishes to a material extent the liability of improperly shifting the gearing when it is necessary to reverse or bring the driven mechanism to an immediate stop which exists when more than two adjusting devices are employed to obtain a variable-speed action.

Having thus described the invention, what is claimed as new is—

1. In a variable-speed gearing, a driving element, a driven element, change-speed gears driven by said driving element, a clutch for directly connecting the driving element with the driven element, a transmission-gear connected with the driven element and adjustable in two planes, said gear being adapted when adjusted in one plane to throw the clutch into or out of operation or to be positioned opposite one or the other of the change-speed gears and when adjusted in the other plane to be moved into or out of connection with the alined speed-gear, and means for adjusting said transmission-gear.

2. In a variable-speed gearing, a driving element, a driven element, change-speed gears driven by said driving element, a clutch for directly connecting the driving element with the driven element, a transmission-gear connected with the driven element and adjustable in two planes, said gear being adapted when adjusted in one plane to throw the clutch into or out of operation or to be positioned opposite one or the other of the change-speed gears and when adjusted in the other plane to be moved into or out of connection with the alined speed-gear, means for sliding the transmission-gear for the first adjustment, and means for tilting said gear for the second adjustment.

3. The combination with a driving-shaft, and a driven shaft, of change-speed gears driven by said driving-shaft, an element adjustable in one direction to connect or disconnect said shafts or when the shafts are disconnected to aline with one or the other of the change-speed gears, and means for adjusting said element in a different direction when said shafts are disconnected to connect the driven shaft with the alined change-speed gear.

4. The combination with a driving-shaft, and a driven shaft, of interposed change-speed gears driven by said driving-shaft, an element adjustable longitudinally of said gearing in one direction to connect or disconnect said shafts or, when the shafts are disconnected, to aline with one or the other of the change-speed gears, and means for adjusting said element laterally of the change-speed gearing when said shafts are disconnected to connect the driven shaft with the alined element of the change-speed gearing.

5. In a variable-speed gearing, the combination of a main drive-shaft, a power-shaft disposed in alinement therewith, a power-transmitting shaft disposed in parallel relation to the power-shaft, a clutch for directly connecting the power-shaft with the main drive-shaft, gearing for normally connecting the main drive-shaft with the power-transmitting shaft, change-speed gears on the power-transmitting shaft, a transmission-gear longitudinally adjustable on the power-shaft to operate the clutch or aline with any of said change-speed gears and laterally adjustable thereon to mesh with the alined change-speed gear, and means for throwing the gearing between the main drive and power shafts out of operation and simultaneously operating said clutch to directly connect said main drive-shaft with the power-shaft.

6. The combination with a driving-shaft, and a driven shaft disposed in longitudinal alinement therewith, of a transmission-shaft arranged in parallel relation to the drive and driven shafts and driven from the former, change-speed gears on said transmission-shaft an element adjustable in a plane parallel with the transmission-shaft and coincident with the drive and driven shafts for connecting or disconnecting said drive and driven shafts or, when said shafts are disconnected, to aline with one or the other of the change-speed gears, and also adjustable laterally of the first-named plane when said drive and driven shafts are disconnected to connect the driven shaft with the alined change-speed gear, and means for adjusting said element, substantially as described.

7. In a variable-speed gearing, the combination of a main drive-shaft, a power-shaft, a power-transmitting shaft, gearing between the main drive-shaft and the power-transmitting shaft, change-speed gears on the power-transmitting shaft, a transmission-gear on the power-shaft adjustable to engage any of said change-speed gears, means for coupling the main drive-shaft directly to the power-shaft, eccentric mechanism for changing the position of the power-transmitting shaft to throw the gearing between the same and the main drive-shaft into and out of operation, and means for simultaneously operating said coupling means and eccentric mechanism to disconnect the main drive-shaft from the power-transmitting shaft and connect it with the power-shaft, and vice versa, substantially as described.

8. Variable-speed mechanism comprising a driving part, a driven part, means for directly connecting said parts, a transmission member driven by the driving part and carrying change-speed gears, a transmission-gear carried by the driven part, an element adjustable to connect or disconnect said connecting means and to position said transmission-gear for connection with any one of the change-speed gears, and also adjustable when so positioned to connect the transmission-gear with one of the change-speed gears, and means for effecting said adjustments of said element.

9. In a variable-speed gearing, the combination of a main drive-shaft, a power-shaft, a power-transmitting shaft, an eccentric for adjusting said power-transmitting shaft, change-speed gears on the power-transmitting shaft, gearing between the main drive-shaft and power-transmitting shaft, said gearing adapted to be thrown into and out of operation by a change of position of said shaft through the action of said eccentric, a power-transmission gear coöperating with the power-shaft and adapted to engage any of said change-speed gears, a coupling actuated by said power-transmission gear for connecting the main drive-shaft directly with the power-shaft, an operating-lever, means connecting said lever with the eccentric to connect or disconnect the gearing between the main drive-shaft and power-shaft, and means for operating the transmission-gear to control the coupling and change-speed gears.

10. In a variable-speed gearing, a drive-shaft, a driven shaft, a clutch for directly coupling said shafts, change-speed gears, means for normally driving the same from the main drive-shaft, a sliding and pivoted element for operating the clutch, a rotating element for adjusting the change-speed gears to connect them with or disconnect them from the main drive-shaft, means for operating said rotating element, a transmission-gear carried by said sliding and pivoted element, and means for operating the sliding and pivoted element.

11. In a variable-speed gearing, the combination of a main drive-shaft, a power-shaft, a power-transmitting shaft, change-speed gears on the power-transmitting shaft, a power-transmitting gear coöperating with the power-shaft and adapted to be thrown into mesh with any of said change-speed gears, means for adjusting said power-transmitting gear, and means associated with said power-transmitting gear for directly connecting the main drive-shaft with the power-shaft or indirectly connecting it therewith through said power-transmitting shaft and change-speed gears.

12. A variable-speed gearing comprising a driving part, a driven part, change-speed mechanism between said parts, said mechanism comprising a series of change-speed gears and a transmission-gear for connecting the same with the driven part, means for moving the transmission-gear in one direction to position it opposite any one of the change-speed gears and moving it at an angle to the first-named direction to throw it into and out of mesh with the change-speed gear with which it has been brought into alinement, and means coacting with the transmission-gear for connecting the driving part with the driven part when said gear is moved in the first direction and disconnected from the change-speed gears.

13. Variable-speed gearing comprising a driving part, a driven part, change-speed mechanism for indirectly connecting said parts, said mechanism having a series of working positions for high and low speeds and varying intermediate speeds, shifting means associated with the driven part for connecting the same with any element of the change-speed mechanism, and means associated with said shifting means and controlled solely thereby for throwing said change-speed mechanism out of operation and directly connecting the driving part with the driven part.

14. Variable-speed gearing comprising a driving part, a driven part, change-speed mechanism for indirectly connecting said parts, said mechanism having a series of working positions for high and low speeds and varying intermediate speeds and including a controlling element slidably and pivotally mounted, said element having a sliding movement in one direction to directly connect the driving and driven parts or to position the change-speed mechanism for any certain speed, and a pivotal movement of varying degrees at an angle to and at different points along the sliding path for connecting the driven element with the change-speed gearing for operation at such speed, and means for operating the said controlling element.

15. In a variable-speed gearing, a driving element, a series of change-speed gears adapted to be driven thereby, an element to be driven, a power-transmission gear having a sliding pivotal connection with said element to be driven whereby it may be brought into alinement with any of said change-speed gears and pivotally adjusted to engage the same, means for adjusting said transmission-gear, and means controlled by said gear for connecting or disconnecting the driving and driven elements.

16. In a variable-speed gearing, the combination of a drive-shaft, a power-shaft disposed in longitudinal alinement therewith, a clutch element carried by the drive-shaft, a power-transmitting shaft disposed in parallel relation to the power-shaft, drive-gearing between the drive and power-transmitting shafts, a series of change-speed gears on the power-transmitting shaft, a carriage slidably and pivotally mounted on the power-shaft, a transmission-gear on the carriage, a clutch member associated with the carriage to engage the clutch member on the drive-shaft, means for sliding the carriage to position the transmission-gear opposite any of said change-speed gears to throw the said clutch members into and out of connection, and means for tilting the carriage to throw the transmission-gear into and out of mesh with the alined change-speed gear.

17. In a variable-speed gearing, the combination of a drive-shaft, a power-shaft disposed in longitudinal alinement therewith, a clutch element carried by the drive-shaft, a power-transmitting shaft disposed in parallel relation to the power-shaft, drive-gearing between the drive and power-transmitting shafts, a series of change-speed gears on the power-transmitting shaft, a carriage slidably and pivotally mounted on the power-shaft, a transmission-gear on the carriage, clutch member associated with the carriage to engage the clutch member on the drive-shaft, a sliding bar connected with said carriage for sliding the same to position the transverse gear opposite any of said change-speed gears or to throw the said clutch element into and out of connection, means for sliding said bar, and means for tilting the carriage to throw the transmission-gear into and out of mesh with the alined change-speed gear.

18. In a variable-speed gearing, the combination of a drive-shaft, a power-shaft disposed in longitudinal alinement therewith, a clutch element carried by the drive-shaft, a power-transmitting shaft disposed in parallel relation to the power-shaft, drive-gearing between the drive and power-transmitting shafts, a series of change-speed gears on the power-transmitting shaft, a carriage slidably and pivotally mounted on the power-shaft, a transmission-gear on the carriage, a clutch member associated with the carriage to engage the clutch member on the drive-shaft, means for sliding the carriage to position the transmission-gear opposite any of said change-speed gears or throw the said clutch members into and out of connection, a rock-shaft and connection between said shaft and carriage to tilt the same to throw the transmission-gear into and out of mesh with the alined change-speed gear, and means for operating said rock-shaft.

19. In a variable-speed gearing, the combination of a drive-shaft, a power-shaft disposed in longitudinal alinement therewith, a clutch element carried by the drive-shaft, a power-transmitting shaft disposed in parallel relation to the power-shaft, drive-gearing between the drive and power-transmitting shafts, a series of change-speed gears on the power-transmitting shaft, a carriage slidably and pivotally mounted on the power-shaft, a transmission-gear on the carriage, a clutch member associated with the carriage to engage the clutch member on the drive-shaft, a sliding rod operatively connected with the carriage for sliding the same to position the transmission-gear opposite any of said change-speed gears or to throw the said clutch devices into and out of connection, a bell-crank lever for operating said rod, means for operating the bell-crank lever, and means for tilting the carriage to throw the transmission-gear into and out of mesh with the alined change-speed gear.

20. In a variable-speed gearing, the combination of a drive-shaft, a power-shaft disposed in longitudinal alinement therewith, a clutch element carried by the drive-shaft, a power-transmitting shaft disposed in parallel relation to the power-shaft, drive-gearing between the drive and power-transmitting shafts, a series of change-speed gears on the power-transmitting shaft, a carriage slidably and pivotally mounted on the power-shaft, a transmission-gear on the carriage, a clutch member associated with the carriage to engage the clutch member on the drive-shaft, a sliding bar for sliding the carriage to position the transmission-gear opposite any of the said change-speed gears or to throw the said clutch devices into and out of connection, means for operating the sliding bar, a rock-shaft, a connection between said shaft and carriage for tilting the latter to throw the transmission-gear into and out of mesh with the alined change-speed gear, and means for actuating said rock-shaft.

21. In a variable-speed gear, the combination of a drive-shaft, a driven shaft, a power-transmitting shaft, a train of gears connecting the drive-shaft with the power-transmitting shaft, a series of change-speed gears on the power-transmitting shaft, a carriage, a power-transmission gear carried thereby, coacting clutch devices on the drive-shaft and carriage, means for sliding the carriage on the driven shaft for throwing said clutch devices into and out of connection or to bring the power-transmission gear into alinement with any of said change-speed gears, means for moving the carriage laterally of the driven shaft to throw said power-transmission gear into and out of mesh with the change-speed gear, and means for adjusting the power-transmission shaft to throw the gear between the same and the drive-shaft into and out of operative connection.

22. In a variable-speed gearing, the combination of a driving element, a driven element, means for directly or indirectly connecting said elements, said means including a clutch for connecting the driving and driven elements, a series of change-speed gears for indirectly connecting the same, means for operating said change-speed gears from the driving element, a power-transmission gear for connecting the driven element with any of the change-speed gears, an element carrying said power-transmission gear and mounted for sliding and tilting movements, means for sliding said element to throw the clutch into and out of operation or to position the transmission-gear opposite any one of the change-speed gears, and means for tilting said element to throw the power-transmission gear into and out of mesh with the alined change-speed gear.

23. Variable-speed mechanism comprising a driving part, a driven part, means for directly connecting said parts, change-speed gearing for indirectly connecting them, said gearing including an element adjustable in two directions and adapted when adjusted in one direction to connect or disconnect said means for directly connecting the driving and driven parts or to position the gearing for a variable-speed action and when adjusted in the other direction to connect one of the variable-speed gears with the driven part, and means for effecting said adjustments of said element.

In testimony whereof I affix my signature in presence of two witnesses.

COLUMBUS K. LASSITER.

Witnesses:
SARAH F. MILLER,
LAWRENCE B. SMITH.